United States Patent [19]
Sicilano

[11] Patent Number: 6,125,481
[45] Date of Patent: Oct. 3, 2000

[54] SWIMMING POOL MANAGEMENT SYSTEM

[76] Inventor: Edward N. Sicilano, 26 Euphrasia Drive, North York, Ontario, Canada, M6B 3V9

[21] Appl. No.: 09/267,017

[22] Filed: Mar. 11, 1999

[51] Int. Cl.⁷ ..................................................... E04H 4/00
[52] U.S. Cl. ................................. 4/509; 4/496; 210/94; 210/96.1; 210/143; 210/169; 210/739
[58] Field of Search ........................... 4/496, 493, 541.2, 4/541.3, 507, 509; 210/169, 416.2, 143, 96.1, 85, 94, 90, 149, 739, 741, 742, 743

[56] References Cited

U.S. PATENT DOCUMENTS

| | | | |
|---|---|---|---|
| 4,033,871 | 7/1977 | Wall | 210/169 |
| 4,224,154 | 9/1980 | Steininger | 210/85 |
| 4,752,740 | 6/1988 | Steininger | 210/169 |
| 5,169,236 | 12/1992 | Iest | 4/496 |
| 5,422,014 | 6/1995 | Allen et al. | 210/743 |
| 5,616,239 | 4/1997 | Wendell et al. | 210/169 |
| 5,895,565 | 4/1999 | Steininger et al. | 210/85 |
| 5,984,178 | 11/1999 | Gill et al. | 340/825.16 |
| 5,985,155 | 11/1999 | Maitland | 210/739 |

*Primary Examiner*—Henry J. Recla
*Assistant Examiner*—Tuan Nguyen

[57] ABSTRACT

A swimming pool management system that is adapted for use with a dispenser connected to a pool for dispensing a substance into the pool upon the actuation thereof. The swimming pool management system includes a sensor positioned downstream of the dispenser for monitoring a level of the substance within the pool. A controller is connected to the dispenser and the sensor for actuating the dispenser only when certain conditions are met.

15 Claims, 5 Drawing Sheets

SWIMMING POOL MANAGEMENT SYSTEM

BACKGROUND OF THE INVENTION

1. Field of the Invention

The present invention relates to swimming pool controllers and more particularly pertains to a new swimming pool management system for controlling and monitoring various features of a swimming pool.

2. Description of the Prior Art

The use of swimming pool controllers is known in the prior art. More specifically, swimming pool controllers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,422,014; 4,224,154; 4,817,217; 4,657,670; U.S. Pat. No. Des. 273,033; and U.S. Pat. No. 4,445,238.

In these respects, the swimming pool management system according to the present invention substantially departs from the conventional concepts and designs of the prior art, and in so doing provides an apparatus primarily developed for the purpose of controlling and monitoring various features of a swimming pool.

SUMMARY OF THE INVENTION

In view of the foregoing disadvantages inherent in the known types of swimming pool controllers now present in the prior art, the present invention provides a new swimming pool management system construction wherein the same can be utilized for controlling and monitoring various features of a swimming pool.

The general purpose of the present invention, which will be described subsequently in greater detail, is to provide a new swimming pool management system apparatus and method which has many of the advantages of the swimming pool controllers mentioned heretofore and many novel features that result in a new swimming pool management system which is not anticipated, rendered obvious, suggested, or even implied by any of the prior art swimming pool controllers, either alone or in any combination thereof.

To attain this, the present invention is adapted for use with a pool including a body of water, a water pump, a filter, a heater for heating water dispensed into the pool upon the actuation thereof. While not shown, a first pipe is connected between the body of water and the water pump, a second pipe is connected between the water pump and the filter, a third pipe is connected between the filter and the heater, and a fourth pipe is connected between the heater and the body of water. Also included is a chlorine dispenser connected to one of the pipes of the pool for dispensing chlorine into the pool upon the actuation thereof. An alkaline/acid dispenser is connected to one of the pipes of the pool for dispensing an alkaline/acid substance into the pool upon the actuation thereof.

As shown in FIG. 5, the present invention includes a control panel having a top face, a bottom face, and a periphery formed therebetween for defining an interior space. The top face of the control panel includes a liquid crystal display for depicting alphanumeric characters. Also positioned on the top face of the control panel is a chlorine light, a pH light, a temperature light, and a pressure light each for illuminating only upon the actuation thereof. The control panel is further connected to a plurality of auxiliary components. Such components include a chlorine sensor mounted on one of the pipes downstream of the chlorine dispenser for indicating a chlorine level of the water flowing thereby. A pH sensor is mounted to one of the pipes downstream of the alkaline/acid dispenser for indicating a pH of the water flowing thereby. The auxiliary components further include a heater sensor connected to one of the pipes downstream of the heater for indicating a temperature of the water flowing thereby. A first and second pressure sensor are connected to one of the pipes upstream and downstream of the filter, respectively. Finally, a flow sensor is connected to the control panel for indicating a rate of flow within the pipes. While not shown, a controller is positioned within the control panel and connected between each of the various components set forth hereinabove. The controller serves to display a current first pressure indicated by the first pressure sensor and further display a current second pressure indicated by the second pressure sensor. Upon a difference between the first pressure and the second pressure being greater than a predetermined pressure amount, the controller continuously actuates the pressure light. Further, upon the difference between the first pressure and the second pressure being less than or equal to the predetermined pressure amount and the first pressure being equal to zero, the controller is adapted to sample the current second pressure indicated by the second pressure sensor. While such samples are being taken, the controller calculates a mean pressure. If the mean pressure is below a predetermined pressure difference, the controller intermittently actuates the pressure light. The controller is further adapted to display a current temperature indicated by the temperature sensor. Upon the current temperature being below a desired temperature amount, the controller is adapted to continuously actuate the heater and the temperature light. The controller intermittently actuates the temperature light upon a difference between the current temperature and the desired temperature amount being above a predetermined temperature amount. In order to monitor and control chlorine within the pool, the controller is adapted to display a current chlorine level indicated by the chlorine sensor. Upon the current chlorine level being less than a predetermine chlorine amount, the controller continuously actuates the chlorine light and actuates the chlorine dispenser. Further, the controller intermittently actuates the chlorine light upon there being no change in the current chlorine level after the actuation of the chlorine dispenser. This indicates that the chlorine dispenser is empty. In use, the controller continuously calculates a product of a current flow rate, the current chlorine level and a predetermined constant. Upon the product being equal to a predetermined normal chlorine dosage amount, the chlorine dispenser is deactuated. Finally, the controller serves to display a current pH level indicated by the pH sensor. While monitoring the pH level of the pool, the controller continuously actuates the pH light and actuates the alkaline/acid dispenser upon the current pH level being less than a predetermine pH amount. Upon there being no change in the current pH level after the actuation of the alkaline/acid dispenser, the controller intermittently actuates the pH light, thereby indicating that the alkaline/acid dispenser is empty. Lastly, the controller continuously calculates a solution of an equation including a current flow rate, the current pH level and a predetermined constant. Upon the solution being equal to a predetermined normal alkaline/acid dosage amount, the alkaline/acid dispenser is deactuated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new swimming pool management system apparatus and method which has many of the advantages of the swimming pool controllers mentioned heretofore and many novel features that result in a new swimming pool management system which is not anticipated, rendered obvious, suggested, or even implied by any of the prior art swimming pool controllers, either alone or in any combination thereof.

It is another object of the present invention to provide a new swimming pool management system which may be easily and efficiently manufactured and marketed.

It is a further object of the present invention to provide a new swimming pool management system which is of a durable and reliable construction.

An even further object of the present invention is to provide a new swimming pool management system which is susceptible of a low cost of manufacture with regard to both materials and labor, and which accordingly is then susceptible of low prices of sale to the consuming public, thereby making such swimming pool management system economically available to the buying public.

Still yet another object of the present invention is to provide a new swimming pool management system which provides in the apparatuses and methods of the prior art some of the advantages thereof, while simultaneously overcoming some of the disadvantages normally associated therewith.

Still another object of the present invention is to provide a new swimming pool management system for controlling and monitoring various features of a swimming pool.

Even still another object of the present invention is to provide a new swimming pool management system that is adapted for use with a dispenser connected to a pool for dispensing a substance into the pool upon the actuation thereof. The present invention includes a sensor positioned downstream of the dispenser for monitoring a level of the substance within the pool. A controller is connected to the dispenser and the sensor for actuating the dispenser only when certain conditions are met.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
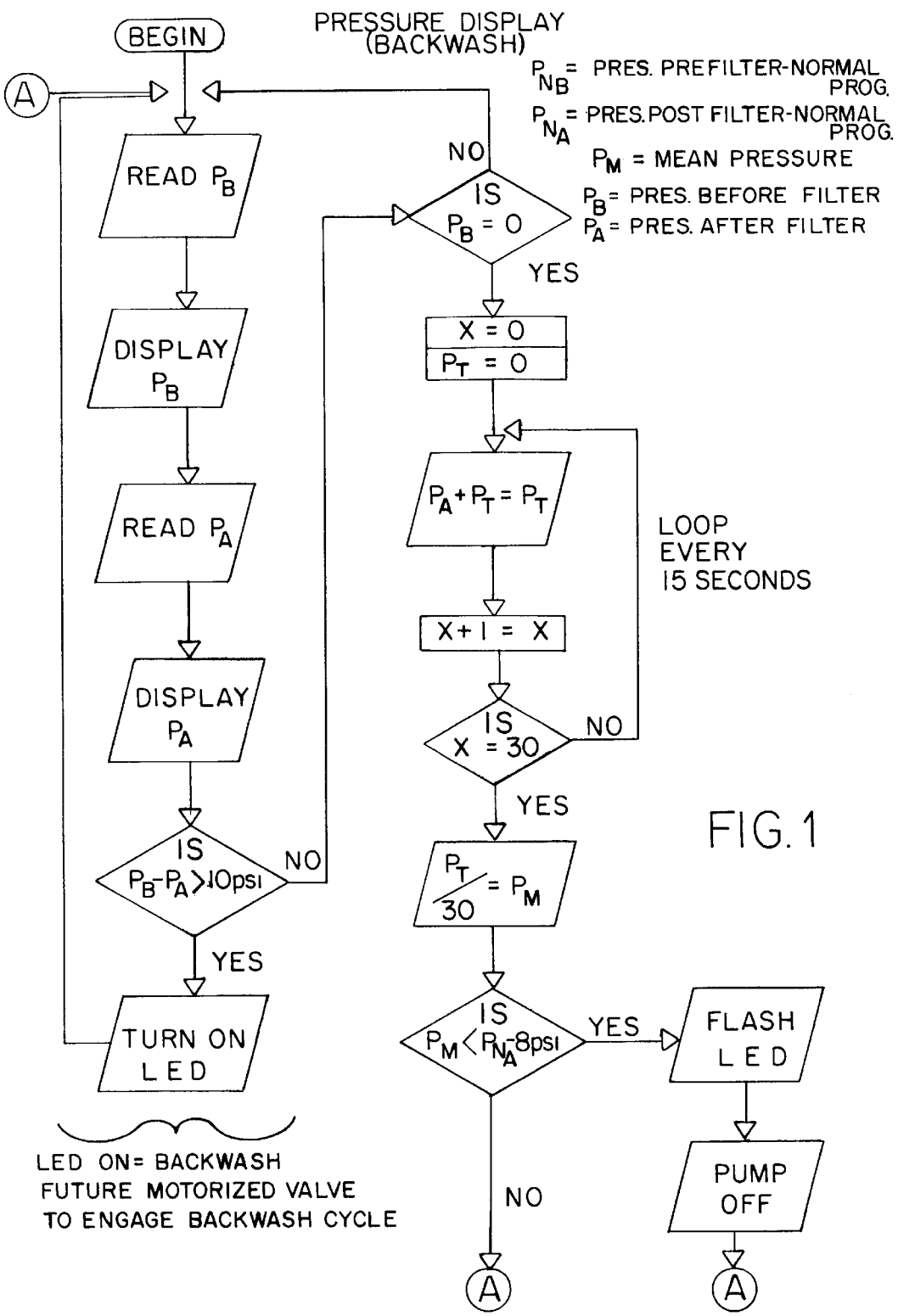
FIG. 1 is a flowchart of the pressure monitoring and control routine of the present invention.

With reference now to the drawings, and in particular to FIGS. 1 through 5 thereof, a new swimming pool management system embodying the principles and concepts of the present invention and generally designated by the reference numeral 10 will be described.

The present invention, designated as numeral 10, is adapted for use with an unillustrated pool including a body of water, a water pump, a filter, a heater for heating water dispensed into the pool upon the actuation thereof. While not shown, a first pipe is connected between the body of water and the water pump, a second pipe is connected between the water pump and the filter, a third pipe is connected between the filter and the heater, and a fourth pipe is connected between the heater and the body of water.

Also included as a component of the pool is a chlorine dispenser(not shown) connected to one of the pipes of the pool for dispensing chlorine into the pool upon the actuation thereof. An alkaline/acid dispenser(not shown) is connected to one of the pipes of the pool for dispensing an acidic alkaline/acid substance into the pool upon the actuation thereof.

Figure 5:
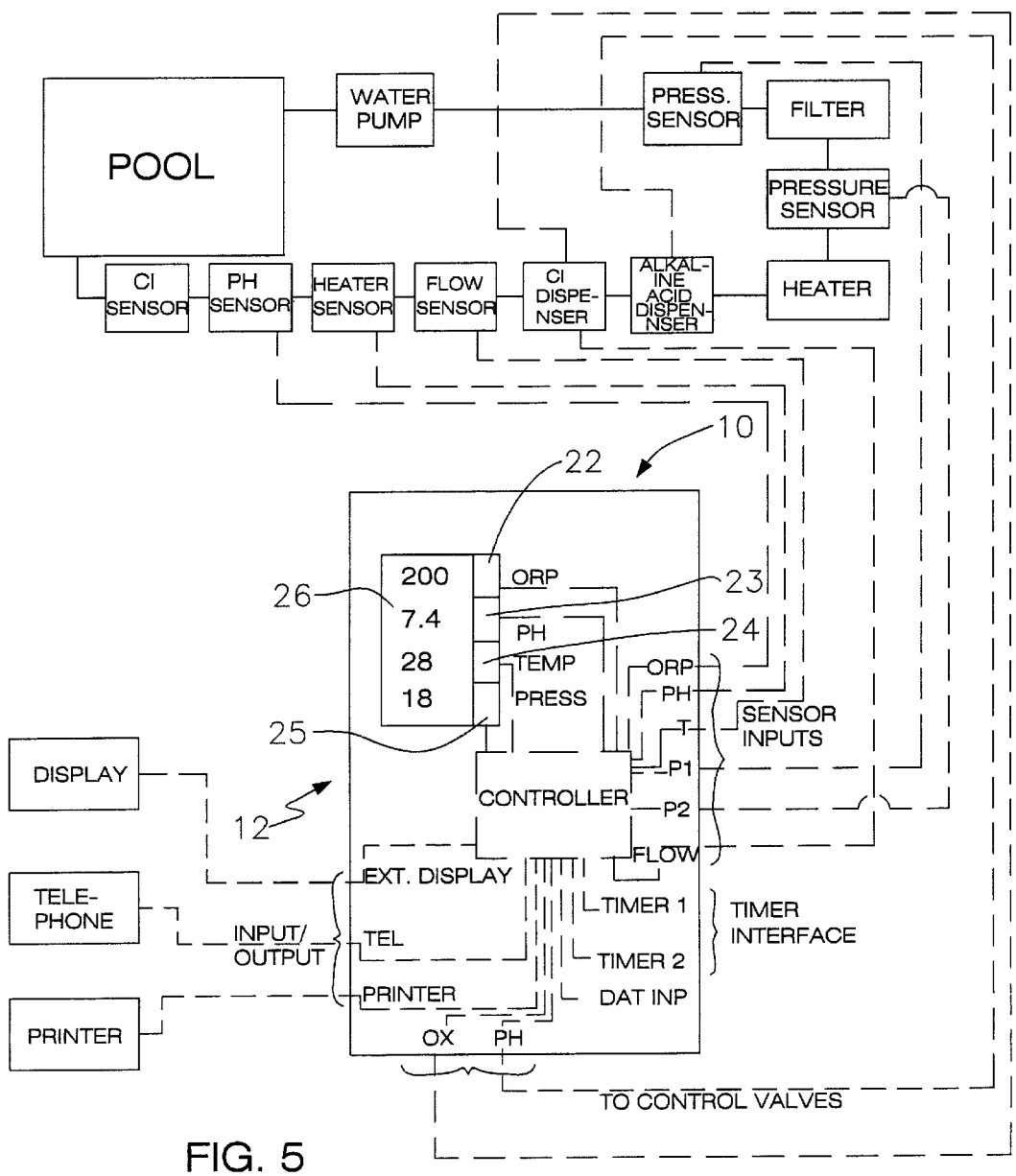
FIG. 5 is a top view of the control panel of the present invention.

FIG. 5 shows a control panel 12 including a top face, a bottom face, and a periphery formed therebetween for defining an interior space. The top face of the control panel includes a liquid crystal display 26 for depicting alphanumeric characters. Also positioned on the top face of the control panel is a chlorine light 22, a pH light 23, a temperature light 24, and a pressure light 25 each for illuminating only upon the actuation thereof.

The control panel is further releasably connected to a plurality of auxiliary components. Such components include a chlorine sensor mounted on one of the pipes downstream of the chlorine dispenser for indicating a chlorine level of the water flowing thereby. A pH sensor is mounted to one of the pipes downstream of the alkaline/acid dispenser for indicating a pH of the water flowing thereby. The auxiliary components further include a heater sensor connected to one of the pipes downstream of the heater for indicating a temperature of the water flowing thereby. A first and second pressure sensor are connected to one of the pipes upstream and downstream of the filter, respectively. Finally, a flow sensor is connected to the control panel for indicating a rate of water flow within the pipes. With the exception of the pressure sensors, each of the sensors are preferably mounted on the fourth pipe.

While not shown, a controller is positioned within the control panel and connected between each of the various components set forth hereinabove. As shown in FIG. 1, the controller serves to display a current first pressure indicated by the first pressure sensor and further display a current second pressure indicated by the second pressure sensor. Upon a difference between the first pressure and the second pressure being greater than a predetermined pressure amount of about 10 psi, the controller continuously actuates the pressure light. Further, upon the difference between the first pressure and the second pressure being less than or equal to the predetermined pressure amount and the first pressure being equal to zero, the controller is adapted to sample the current second pressure indicated by the second pressure sensor. While such samples are being taken, the controller calculates a mean pressure. As shown in FIG. 1, such mean pressure is calculated after 30 loops each taken in 15 second intervals. The sample pressures are totaled and divided by 30 to determine the mean pressure. If the mean pressure is below a predetermined pressure difference, the controller intermittently actuates the pressure light. As shown in FIG. 1, such pressure difference equals 8 psi less than a normal post filter pressure.

Figure 2:
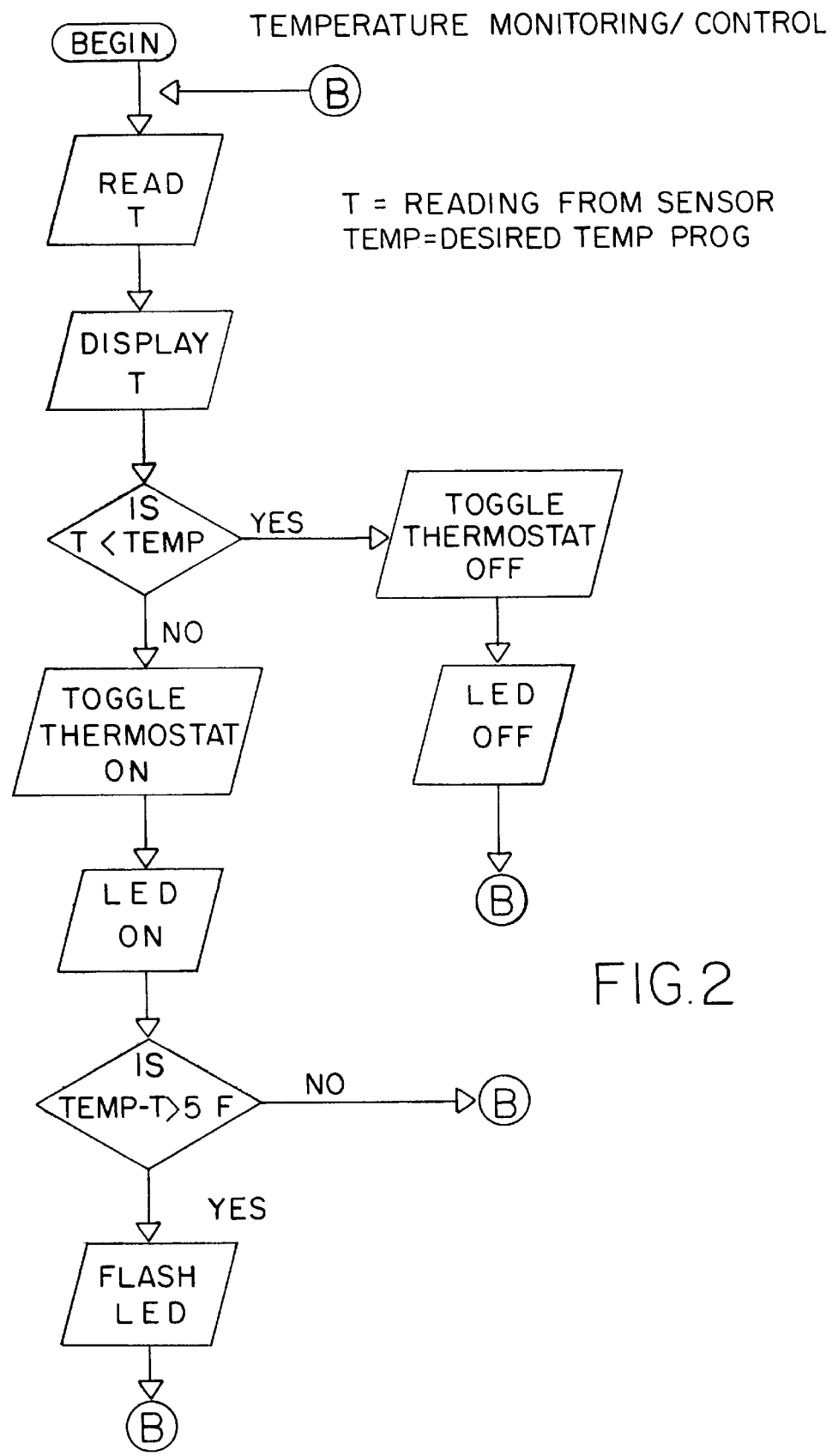
FIG. 2 is a flowchart of the temperature monitoring and control routine of the present invention.

The controller is further adapted to display a current temperature indicated by the temperature sensor. Upon the current temperature being below a desired temperature amount, the controller is adapted to continuously actuate the temperature light and further actuate the heater. As shown in FIG. 2, upon the current temperature being greater than or equal to the desired temperature amount, the controller is adapted to continuously deactuate the temperature light and further deactuate the heater. Finally, the controller intermittently actuates the temperature light upon a difference between the current temperature and the desired temperature amount being above a predetermined temperature amount of 5 degrees F.

Figure 3:
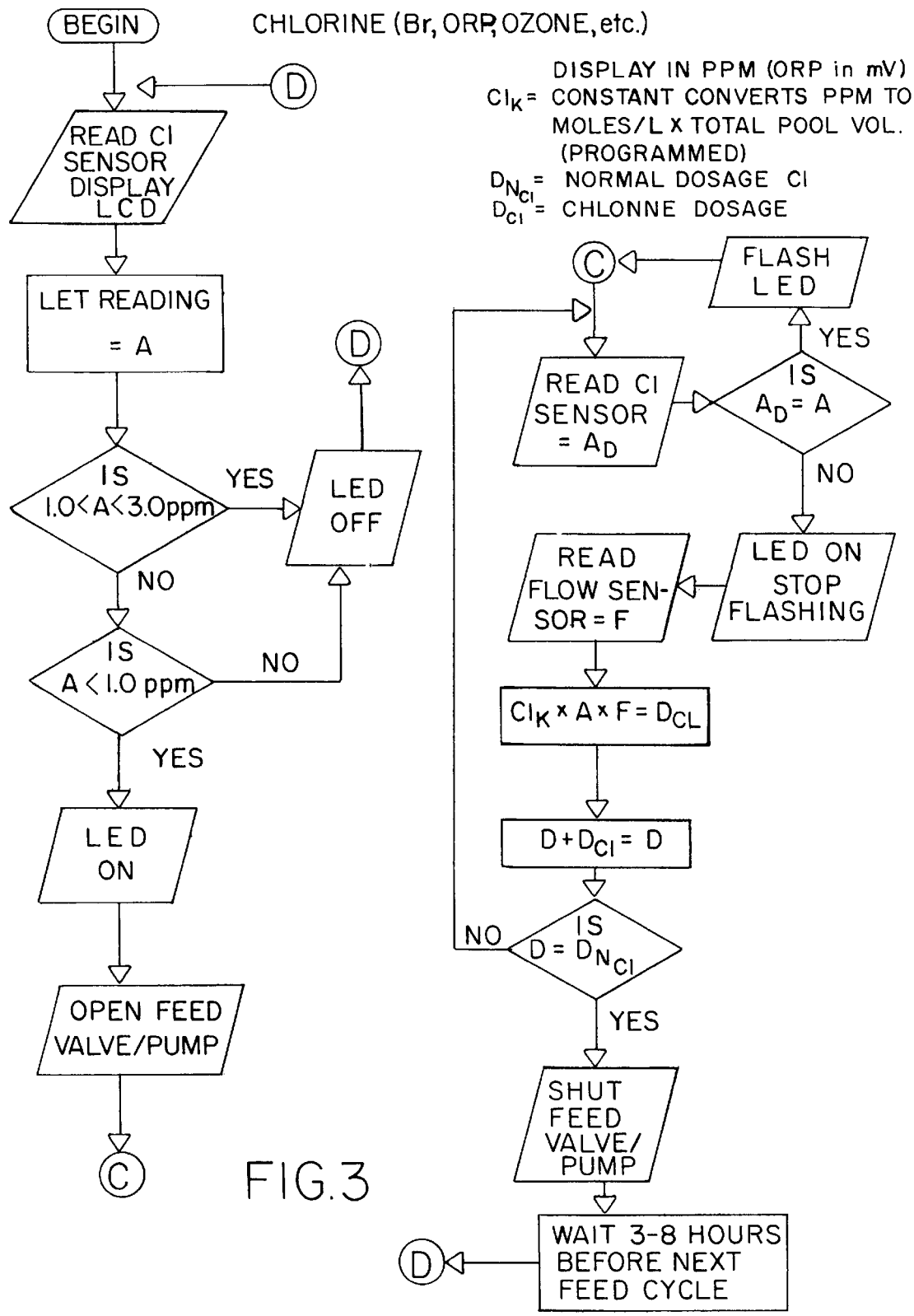
FIG. 3 is a flowchart of the chlorine monitoring and control routine of the present invention.

In order to monitor and control chlorine within the pool, the controller is adapted to display a current chlorine level indicated by the chlorine sensor. Upon the current chlorine level being less than a predetermine chlorine amount of about 1.0 ppm, the controller continuously actuates the chlorine light and actuates the chlorine dispenser. The chlorine light may be optionally deactuated if the current chlorine level is within a predetermined range shown in FIG. 3. Further, the controller intermittently actuates the chlorine light upon there being no change in the current chlorine level after the actuation of the chlorine dispenser. This indicates that the chlorine dispenser is empty. Upon a change in chlorine being detected the chlorine light is no longer intermittently illuminated and the controller continuously calculates a product of a current flow rate, the current chlorine level and a predetermined constant. This constant preferably converts ppm to moles/liter multiplied by total volume of the pool. As such, a current chlorine dosage amount may be calculated. Upon the product representing the current chlorine dosage being equal to a predetermined normal chlorine dosage amount, the chlorine dispenser is deactuated. The foregoing operation of the controller is preferably repeated every 3–8 hours, as shown in FIG. 3.

Figure 4:
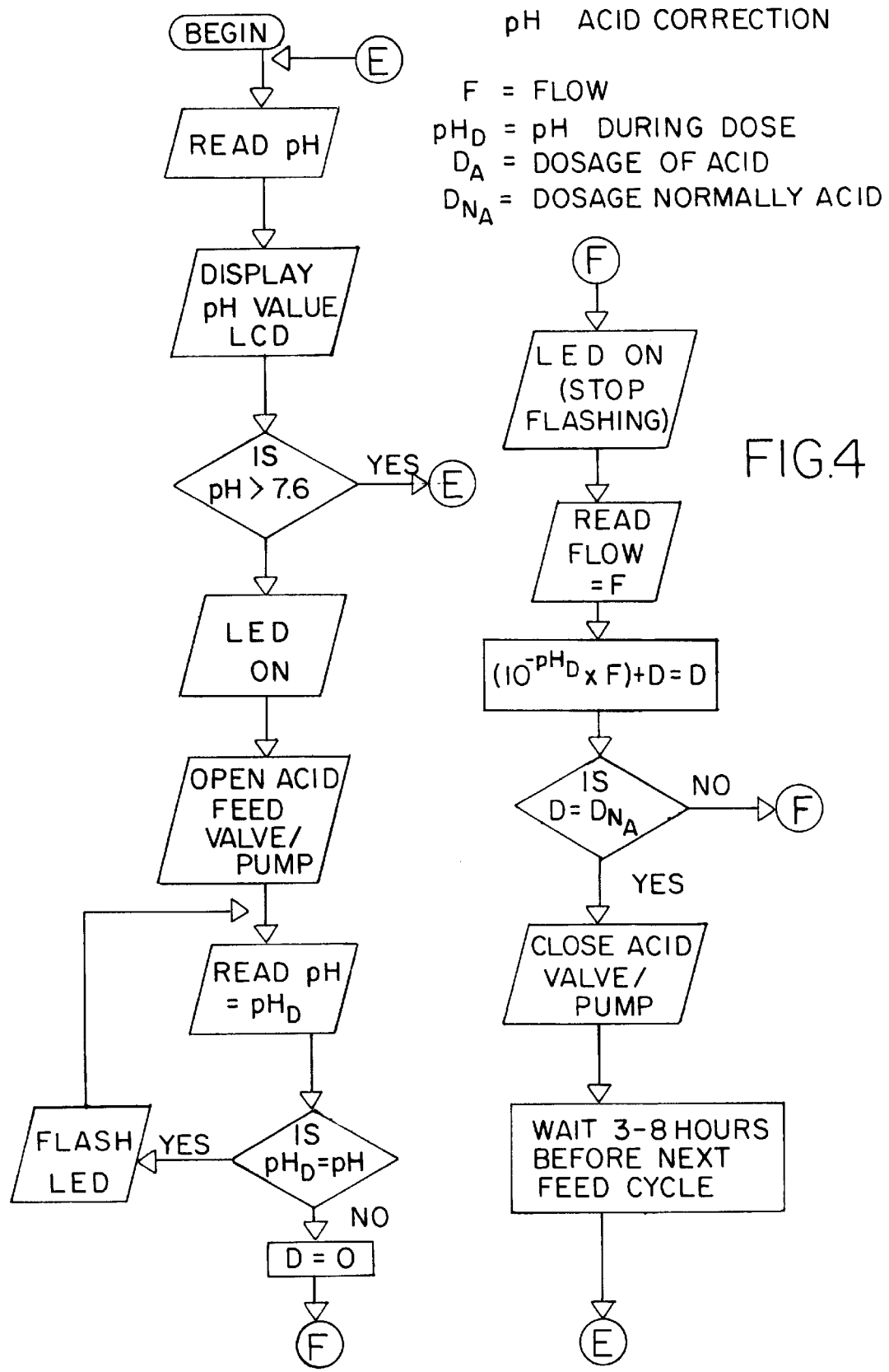
FIG. 4 is a flowchart of the pH monitoring and control routine of the present invention.

The controller serves to display a current pH level indicated by the pH sensor. While monitoring the pH level of the pool, the controller continuously actuates the pH light and actuates the alkaline/acid dispenser upon the current pH level being less than a predetermine pH amount of about 7.6. Upon there being no change in the current pH level after the actuation of the alkaline/acid dispenser, the controller intermittently actuates the pH light, thereby indicating that the alkaline/acid dispenser is empty. Once a change in pH is detected, the pH light is no longer intermittently illuminated and the controller continuously calculates a solution of an equation including a current flow rate, the current pH level and a predetermined constant. As such, a current acid dosage may be calculated. Upon the solution representing the current acid dosage being equal to a predetermined normal alkaline/acid dosage amount, the alkaline/acid dispenser is deactuated. Ideally, such equation is that shown in FIG. 4. The foregoing operation of the controller is preferably repeated every 3–8 hours, as shown in FIG. 4.

Finally, the controller is connected to a remote display, a telephone, and a printer for providing an indication upon actuation of at least one of the lights, dispensers, and heater of the system. Such indication may be provided in summary form and further provide alerts under desired conditions. It should be noted that the present invention may employed in combination with one or more conventional timers in order to activate and deactivate operation during user-selected times and for user-selected duration.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pool monitoring and controlling system adapted for use with a pool including a body of water, a water pump, a first pipe connected between the body of water and the water pump, a second pipe connected between the water pump and the body of water, and a dispenser connected to one of the pipes of the pool for dispensing a substance into the pool upon the actuation thereof, wherein the water pump urges water between the pipes, the system comprising:

a sensor adapted for connecting to one of the pipes downstream of the dispenser for monitoring a level of the substance within the pool;

a controller adapted for connecting to the dispenser and the sensor for actuating the dispenser only when certain conditions are met;

wherein the controller is connected a first pressure sensor adapted for connecting to one of the pipes upstream of a filter for indicating a pressure of the water flowing thereby, the controller further connected to a second pressure sensor adapted for connecting to one of the pipes downstream of the filter for indicating a pressure of the water flowing thereby, wherein the controller is adapted for providing an indication upon a difference between the first pressure and the second pressure being greater than a predetermined pressure amount; and wherein the controller, upon the difference between the first pressure and the second pressure being less than or equal to the predetermined pressure amount and the first pressure being equal to zero, further adapted to sample the current second pressure indicated by the second pressure sensor and calculate a mean pressure, wherein the controller is adapted to provide another indication if the mean pressure is below a limit.

2. The pool monitoring and controlling system as set forth in claim 1 and further including a display for depicting the level.

3. The pool monitoring and controlling system as set forth in claim 1 and further including a light for illuminating when the dispenser is actuated.

4. The pool monitoring and controlling system as set forth in claim 1 wherein said controller is adapted for connecting to a telephone for providing a remote indication upon the conditions being met.

5. The pool monitoring and controlling system as set forth in claim 1 wherein said controller is adapted for connecting to a facsimile for providing a remote indication upon the conditions being met.

6. The pool monitoring and controlling system as set forth in claim 1 wherein the substance is chlorine and the controller is adapted to provide a first indication and actuate the dispenser upon the current chlorine level being less than a predetermine chlorine amount, provide a second indication upon there being no change in the current chlorine level after the actuation of the dispenser thereby indicating that the dispenser is empty, and continuously calculating a product of a current flow rate, the current chlorine level and a predetermined constant, wherein the dispenser is deactuated upon the product being equal to a predetermined normal chlorine dosage amount.

7. The pool monitoring and controlling system as set forth in claim 1 wherein the substance is acidic and the controller is adapted to provide a first indication and actuate the dispenser upon the current acid level being less than a predetermine acid amount, provide a second indication upon there being no change in the current acid level after the actuation of the dispenser thereby indicating that the dispenser is empty, and continuously calculating a solution of an equation including a current flow rate, the current pH level and a predetermined constant, wherein the dispenser are deactuated upon the solution being equal to a predetermined normal alkaline/acid dosage amount.

8. The pool monitoring and controlling system as set forth in claim 1 wherein the dispenser is adapted for connecting to one of the pipes of the pool upstream of a heater.

9. The pool monitoring and controlling system as set forth in claim 1 further comprises:

a control panel including a top face, a bottom face, and a periphery formed therebetween for defining an interior space, the top face of the control panel including a liquid crystal display for depicting alphanumeric characters, a chlorine light for illuminating only upon the actuation thereof, a pH light for illuminating only upon the actuation thereof, a temperature light for illuminating only upon the actuation thereof, and a pressure light for illuminating only upon the actuation thereof, the control panel connected to a chlorine sensor connected to one of the pipes downstream of the chlorine dispenser for indicating a chlorine level of the water flowing thereby, a pH sensor connected to one of the pipes downstream of the alkaline/acid dispenser for indicating a pH of the water flowing thereby, a heater sensor connected to one of the pipes downstream of the heater for indicating a temperature of the water flowing thereby, and a flow sensor for indicating a rate of flow within the pipes; and said controller positioned within the control panel and connected between the display, the pressure light, the first pressure sensor, the second pressure sensor, and the filter, the controller adapted to display a current first pressure indicated by the first pressure sensor, display a current second pressure indicated by the second pressure sensor, wherein the controller is adapted to intermittently actuate the pressure light and if the mean pressure is below a predetermined pressure difference;

said controller further connected between the display, the temperature light, the temperature sensor, and the heater, the controller adapted to display a current temperature indicated by the temperature sensor, continuously actuate the heater and the temperature light upon the current temperature being below a desired temperature amount, and intermittently actuate the temperature light upon a difference between the current temperature and the desired temperature amount being above a predetermined temperature amount;

said controller further connected between the display, the chlorine light, the chlorine sensor, the flow sensor, the chlorine dispenser, and the filter, the controller adapted to display a current chlorine level indicated by the chlorine sensor, continuously actuate the chlorine light and actuate the chlorine dispenser upon the current chlorine level being less than a predetermine chlorine amount, intermittently actuate the chlorine light upon there being no change in the current chlorine level after the actuation of the chlorine dispenser thereby indicating that the chlorine dispenser is empty, and continuously calculating a product of a current flow rate, the current chlorine level and a predetermined constant, wherein the chlorine dispenser is deactuated upon the product being equal to a predetermined normal chlorine dosage amount;

said controller further connected between the display, the pH light, the pH sensor, the flow sensor, and the alkaline/acid dispenser, the controller adapted to display a current pH level indicated by the pH sensor, continuously actuate the pH light and actuate the alkaline/acid dispenser upon the current pH level being less than a predetermine pH amount, intermittently actuate the pH light upon there being no change in the current pH level after the actuation of the alkaline/acid dispenser thereby indicating that the alkaline/acid dispenser is empty, and continuously calculating a solution of an equation including a current flow rate, the current pH level and a predetermined constant, wherein the alkaline/acid dispenser is deactuated upon the solution being equal to a predetermined normal alkaline/acid dosage amount;

said controller connected to a remote display, a telephone, and a printer for providing an indication upon actuation of at least one of the lights, dispensers, and heater of the system.

10. A pool monitoring and controlling system adapted for use with a pool including a body of water, a water pump, a first pipe connected between the body of water and the water pump, a second pipe connected between the water pump and the body of water, and a dispenser connected to one of the pipes of the pool for dispensing a substance into the pool upon the actuation thereof, wherein the water pump urges water between the pipes, the system comprising:

- a sensor adapted for connecting to one of the pipes downstream of the dispenser for monitoring a level of the substance within the pool;
- a controller adapted for connecting to the dispenser and the sensor for actuating the dispenser only when certain conditions are met; and
- wherein the substance is chlorine and the controller is adapted to provide a first indication and actuate the dispenser upon the current chlorine level being less than a predetermine chlorine amount, provide a second indication upon there being no change in the current chlorine level after the actuation of the dispenser thereby indicating that the dispenser is empty, and continuously calculating a product of a current flow rate, the current chlorine level and a predetermined constant, wherein the dispenser is deactuated upon the product being equal to a predetermined normal chlorine dosage amount.

11. The pool monitoring and controlling system as set forth in claim 10 and further including a display for depicting the level.

12. The pool monitoring and controlling system as set forth in claim 10 and further including a light for illuminating when the dispenser is actuated.

13. The pool monitoring and controlling system as set forth in claim 10 wherein said controller is adapted for connecting to a telephone for providing a remote indication upon the conditions being met.

14. The pool monitoring and controlling system as set forth in claim 10 wherein said controller is adapted for connecting to a facsimile for providing a remote indication upon the conditions being met.

15. A pool monitoring and controlling system adapted for use with a pool including a body of water, a water pump, a first pipe connected between the body of water and the water pump, a second pipe connected between the water pump and the body of water, and a dispenser connected to one of the pipes of the pool for dispensing a substance into the pool upon the actuation thereof, wherein the water pump urges water between the pipes, the system comprising:

- a sensor adapted for connecting to one of the pipes downstream of the dispenser for monitoring a level of the substance within the pool;
- a controller adapted for connecting to the dispenser and the sensor for actuating the dispenser only when certain conditions are met; and
- wherein the substance is acidic and the controller is adapted to provide a first indication and actuate the dispenser upon the current acid level being less than a predetermine acid amount, provide a second indication upon there being no change in the current acid level after the actuation of the dispenser thereby indicating that the dispenser is empty, and continuously calculating a solution of an equation including a current flow rate, the current pH level and a predetermined constant, wherein the dispenser are deactuated upon the solution being equal to a predetermined normal alkaline/acid dosage amount.

* * * * *